United States Patent [19]

Schneider et al.

[11] Patent Number: 4,471,419
[45] Date of Patent: Sep. 11, 1984

[54] CIRCUITRY AND METHOD OF OPERATION FOR AN INTERMEDIATE-LIKE CONVERTER

[75] Inventors: Hans-Peter Schneider, Herzogenaurach; Hans-Hermann Zander, Erlangen, both of Fed. Rep. of Germany

[73] Assignee: Siemens Aktiengesellschaft, Berlin and Munich, Fed. Rep. of Germany

[21] Appl. No.: 429,867

[22] Filed: Sep. 30, 1982

[30] Foreign Application Priority Data

Oct. 20, 1981 [DE] Fed. Rep. of Germany ....... 3141621

[51] Int. Cl.³ .......................................... H02P 13/24
[52] U.S. Cl. ..................................... 363/37; 318/807
[58] Field of Search ...................... 318/798, 803, 807; 363/34, 37, 38, 41

[56] References Cited

U.S. PATENT DOCUMENTS

| 4,158,163 | 6/1979 | Eriksen et al. | 363/37 X |
| 4,270,078 | 5/1981 | Walker et al. | 363/37 X |
| 4,274,042 | 6/1981 | Walker et al. | 318/803 |
| 4,328,454 | 5/1982 | Okuyama et al. | 318/803 |
| 4,366,427 | 12/1982 | Walker et al. | 318/807 X |

OTHER PUBLICATIONS

"Thyristoren," by Heumann and Stumpe, 3rd Edition, 1974, p. 198.

*Primary Examiner*—William M. Shoop
*Attorney, Agent, or Firm*—Kenyon & Kenyon

[57] ABSTRACT

Circuitry for, and method of operating, an intermediate-link converter of the type wherein two controlled anti-parallel-connected converters are connected via an intermediate link having an impressed voltage to an inverter having a plurality of addressable switches in a three-phase bridge circuit. The polarity of the intermediate-link current is interrogated 30° after every change of the addressing combination of the switches of the inverter. If the interrogated polarity of the intermediate-link voltage is larger than a desired value by a predetermined amount, the converter which is arranged in the feeding-in direction is switched off and the other converter, which is arranged in the feedback direction is switched on. In this manner, a load connected to the inverter can feedback energy into a supply network via the intermediate link and a converter operating as an inverter.

6 Claims, 6 Drawing Figures

CIRCUITRY AND METHOD OF OPERATION FOR AN INTERMEDIATE-LIKE CONVERTER

BACKGROUND OF THE INVENTION

This invention relates generally to systems for operating intermediate-link frequency converters, and more particularly, to a system wherein energy is conducted in two directions via two antiparallel-connected controlled converters which are coupled to an intermediate-link converter by an inverter in a three-phase bridge circuit.

A known intermediate-link converter which utilizes an intermediate DC link is described in the text Thyristoren, by Heumann and Stumpe, 3rd Edition, 1974, page 198. It is often desirable to operate a frequency converter in both energy directions such that a load is supplied electrical energy from a supply voltage source, and the load may function as a generator to feedback electrical energy to the source. In this manner, electrical motors can be braked almost without loss by feeding back the energy to the supply voltage source. Such energy-recovering circuits have been provided heretofore only for converters having a DC intermediate link. In such known circuits, the direction of the current in the intermediate link is preserved, and only the voltage in the intermediate link is reversed. This operation is effected by simply shifting the control angle of the inverter in the manner described in the known reference Thyristor Handbuchs, by Hoffmann and Stocker, 4th Edition, 1976, page 348. In this known system, the inverter operates as a rectifier and a continuous transition occurs between the feeding-in and feedback modes of operation. Thus, in intermediate-link converters of the type wherein a DC intermediate link is utilized with an impressed voltage thereon, only the intermediate-link current, but not the intermediate-link voltage, can be reversed. A separate rectifier is required to conduct the reverse current so that the intermediate-link converter comprises two antiparallel-connected rectifiers on its input side. When the system enters the recovery, or feeding-in, mode of operation, this second rectifier must be switched on.

It is, therefore, an object of this invention to provide a system for operating an intermediate-link converter wherein the antiparallel-connected rectifiers on the input side are switched over as soon as the conditions for recovery are present.

It is a further object of this invention to provide a circuit arrangement which implements the above-mentioned method.

SUMMARY OF THE INVENTION

The foregoing and other objects are achieved by this invention which provides a system of the type wherein an intermediate link bears an impressed voltage, and 30° after each change of the addressing combination of the switches of the inverter, the polarity of the intermediate link current is interrogated. The voltage at the intermediate link is compared against a reference voltage value. The rectifier of the intermediate-link converter which is connected in the feedback direction is switched on as long as the interrogated polarity of the intermediate-link current is negative, and the intermediate-link voltage is above the desired value by a fixed, predetermined amount. If these conditions are not met, the rectifier which is arranged in the feed-in direction of the intermediate-link converter is switched on.

In accordance with the method aspect of the present invention, it is possible to recognize, in an intermediate-link converter with a DC voltage intermediate link, the requirements for a recovery from a load into a supply voltage source reliably, and to switch the rectifier on the input side to inverter operation. In this manner, it is possible to operate the intermediate-link converters having a DC intermediate link in two energy directions.

In accordance with a circuit arrangement aspect of the invention for implementing the foregoing method, a measured value for the intermediate-link current is advantageously supplied to an operational amplifier which provides at its output a desired polarity signal. The measured value is conducted to the operational amplifier via a polarity interrogating stage which contains an electronic measurement value switch and a smoothing stage. The electronic measurement value switch is driven by a control unit of the inverter, and the switch of the inverter is closed for a short time 30° after each change of the addressing combination. In this manner, it is ascertained whether electrical energy flows from the intermediate link into the load, or from the load into the intermediate link.

The output currents of the three phases of the inverters are each conducted to respective switches and, via inverters, to three further switches of a multiplexer which forms an overall measurement value for the intermediate-link current. The other terminals of the switches are connected to a common output at which the desired measurement value for the intermediate-link current is provided. The switches are addressed dependent upon the addressing combination of the switches in the inverter.

In accordance with the invention, the intermediate-link current can be determined from the output currents of the inverter. This provides the significant advantage that the DC current in the intermediate link need not be measured separately. Instead, the current transformers which are customarily provided in the output circuit of the inverter can be utilized for forming a measurement value for the intermediate-link currents.

Advantageously, the rectified and filtered output voltage of the intermediate-link converter, as well as the desired value for the output voltage, can be conducted to respective inputs of a comparator stage which delivers at its output a signal for the voltage increase as soon as the output voltage of the intermediate-link converter exceeds the desired value by a fixed amount. Thus, the signal for the voltage increase can also be formed without direct measurement of the intermediate-link voltage. Instead, the intermediate-link voltage is formed directly from the output voltage of the intermediate-link converter which customarily is measured anyway.

The antiparallel rectifiers are advantageously switched-over by feeding the polarity signal for the voltage increase to both inputs of an AND gate, the output of which is connected to a double throw switching device for the two rectifiers.

BRIEF DESCRIPTION OF THE DRAWINGS

Comprehension of the invention is facilitated by reading the following detailed description in conjunction with the annexed drawings, in which.

DETAILED DESCRIPTION

Figure 1:
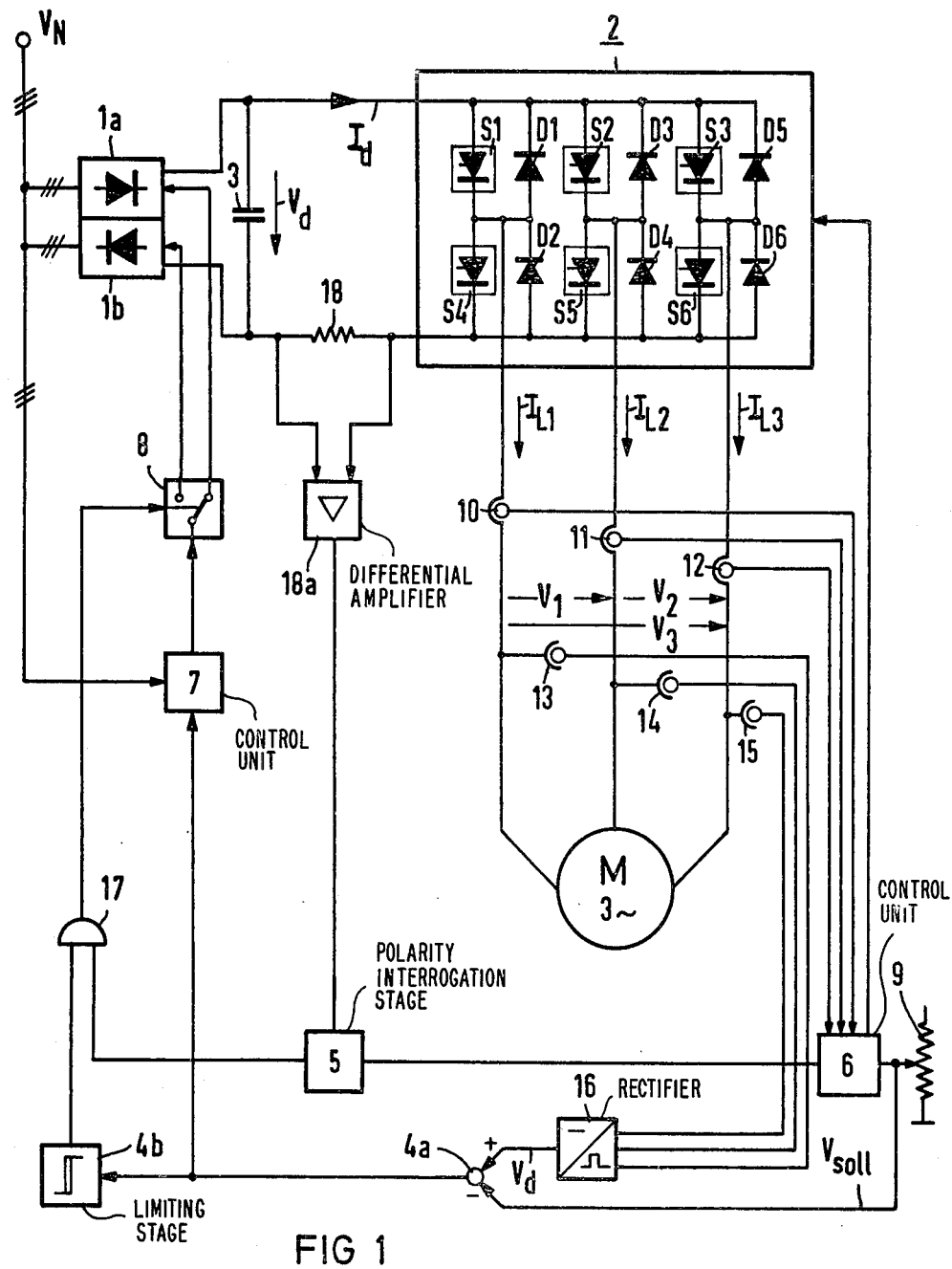
FIG. 1 is a block and schematic representation of an intermediate-link frequency converter which is constructed and operated in accordance with the principles of the present invention.

FIG. 1 is a block and schematic diagram of an intermediate-link frequency converter which is operated in accordance with the principles of the invention. Two antiparallel-connected controlled rectifiers $1a$ and $1b$, illustratively in a three-phase bridge circuit, are connected to a supply network having a voltage $V_N$. Rectifiers $1a$ and $1b$ are coupled to an inverter 2. As will be described hereinbelow, inverter 2 can be operated as a rectifier. However, the designation "inverter" is retained in this description to preserve clarity and uniformity. A capacitor 3 having a relatively high capacity is shunted across the output terminal of rectifiers $1a$ and $1b$, as shown, so that an intermediate-link voltage $V_d$ is impressed thereacross. A motor M is connected as a load to the three-phase AC output of inverter 2. Antiparallel-connected converters $1a$ and $1b$, as well as inverter 2, are addressed by control units 6 and 7, respectively. The control units are of a known type and are described, for example, in the text *Industrie-Elektronik* by Ernst and Stroehle, 1973, pages 52 to 56. Control unit 7 addresses inverters $1a$ and $1b$ via a double-throw switching device 8 which selects the particular one of the inverters to be addressed. The line voltage $V_N$ is conducted to control unit 7 as the control variable.

A reference voltage $V_{soll}$ for inverter 2 is produced by a reference voltage generator 9, and is conducted to control unit 6. Moreover, three current transformers 10, 11, and 12 are provided with their inputs connected to control unit 6 so as to provide control unit 6 with measurement values for the output currents $I_{L1}$, $I_{L2}$, and $I_{L3}$.

As long as motor M is consuming energy, converter $1a$ operates as a rectifier and converts the input AC voltage $V_N$ into a DC voltage $V_d$ in the intermediate link. The DC voltage $V_d$ is again converted by the inverter 2 into a three-phase AC voltage having a variable frequency for operating the motor M. The individual phase voltages of the three-phase voltage are designated $V_1$, $V_2$ and $V_3$.

If motor M is driven from the shaft side, or if the output frequency of inverter 2 drops such that the motor is braked, energy flows from motor M via bypass diodes D1 to D6 back into the intermediate link capacitor. In the process, the direction of the active component of the intermediate-link current $I_d$ is reversed, while the polarity of the intermediate-link voltage $V_d$ is retained. In this manner, the power supplied by motor M, operating as a generator, is conducted back into the network, and converter $1a$ which is operated as a rectifier must be switched off, and converter $1b$ which is operated as an inverter must be switched on. In order to produce this reversal, which is accomplished via double-throw switch 8, it must first be determined whether the motor M actually feeds back to the intermediate-link capacitor 3. This condition must be ascertained reliably because a false switching operation would lead to disturbances in the operation of the motor. The feeding back from motor M into the intermediate-link capacitor 3 results in an increase of the intermediate-link voltage $V_d$, as well as polarity reversal of the active component of the intermediate-link current $I_d$. Both criteria must be present simultaneously. Determining the intermediate-link voltage $V_d$ alone is not sufficient as a criterion for switching-over, because with the motor idling, the slight ripple of the intermediate-link voltage which is present would generate frequent requests for reversals, thereby producing an unsteady operation of the converter. In addition, the polarity reversal of the intermediate-link current $I_d$, as the only condition for switching to rectifier $1b$, is not in and of itself sufficient because, for light generator operation, the fed-back energy is required for covering the inverter losses.

For these reasons, converter $1a$ is therefore switched from its operation as a rectifier to converter $1b$ operating as an inverter only if the intermediate-link voltage $V_d$ has increased and the active component of the intermediate-link current $I_d$ has reversed its polarity. The increase in the intermediate-link voltage $V_d$ is determined by comparing it with the desired value $V_{soll}$ for the output voltage.

Since the intermediate link generally does not contain a voltage measuring device, intermediate-link voltage $V_d$ is determined indirectly from output voltages $V_1$, $V_2$, and $V_3$ of the intermediate-link converter. These output voltages are, in any event, determined for controlling the converter with voltage transformers 13, 14, and 15. These voltages agree with the intermediate-link voltage $V_d$ if switches S1 to S6 of inverter 2 assigned to the respective phase are closed, and if the voltage drop across these switches is neglected. In order to determine the intermediate-link voltage $V_d$, the output voltages of inverter 2 are rectified by rectifier 16 and smoothed, so that a value which corresponds to intermediate-link voltage $V_d$ in the tolerance range of interest here is present at the output of rectifier 16. Intermediate-link voltage $V_d$ determined in this manner is compared in a comparator 4 with the desired value $V_{soll}$. Comparator 4 is formed of a subtraction stage $4a$ and a limiting stage $4b$ connected thereto. Subtraction stage $4a$ receives at an adding input thereof the intermediate-link voltage $V_d$, and at a subtraction input thereof, the desired voltage $V_{soll}$. If the intermediate-link voltage $V_d$ exceeds the desired voltage $V_{soll}$ by an amount which is predetermined by the limit indicator $4b$, the latter delivers a signal which is conducted to a first input of an AND gate 17. Thus, the first condition for switching from converter $1a$ to converter $1b$ is determined.

At this point, only the polarity of the active component of the intermediate-link current $I_d$ must be determined. Only the active component of the intermediate-link current $I_d$ must be used because intermediate-link current $I_d$ itself changes its direction periodically. A method for determining the polarity of the active component of the intermediate-link current $I_d$ will be explained hereinbelow with reference to FIGS. 2 and 3.

Figure 2:
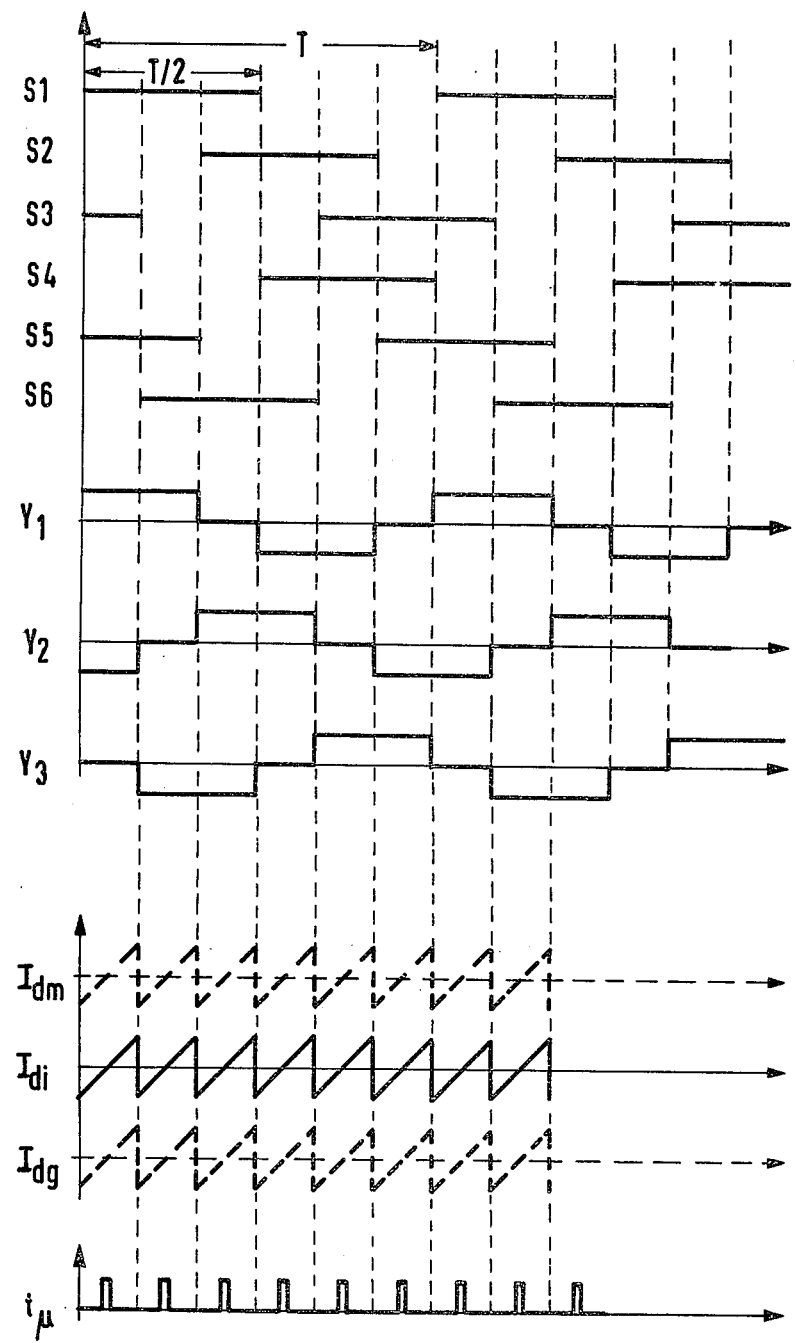
FIGS. 2 and 3 are waveform timing diagrams which are useful in explaining the operation of the invention.

FIG. 2 is a waveform timing diagram showing smoothened output voltages $V_1$, $V_2$, and $V_3$, as well as intermediate-link current $I_d$ for the case of full drive of inverter 2. The two electronic switches belonging to one bridge arm are switched on for a half-period, displaced in time by a half-period each. The "arm" phases of the two adjacent bridge arms are displaced relative to each other always by T/3. As shown in FIG. 1, voltage $V_1$, for example, is equal to the intermediate-link voltage $V_d$ as long as switches S1 and S5 are simultaneously closed. The voltage $V_1$ is zero as long as switches S1 and S2 are closed simultaneously, and the voltage is equal to the negative intermediate-link voltage $V_d$ as long as switches S2 and S4 are closed simultaneously. The waveforms of voltages $V_2$ and $V_3$ are obtained analogously.

If inverter 2 is loaded purely inductively, the intermediate-link current, designated $I_{di}$, is a pure AC current since no active power is taken up or given off by the intermediate-link capacitor 3. Current $I_{di}$ therefore has a sawtooth waveform with a period of T/6. The derivation of this current waveform from the positions of switches S1 to S6 is described in detail in the book *Selbstgefuehrte Thyristor-Stronrichter*, (free-running thyristor converters), by Manfred Meyer, 3rd Edition, pages 197 to 199. Accordingly, such a derivation will not be explained in detail.

If an ohmic load is added to the inductive load, intermediate-link current $I_d$ has a positive DC component such that the curve of the waveform is shifted upward. The intermediate-link current produced in this manner, which occurs in motor operation of the motor M, is designated in FIG. 2 as $I_{dm}$. On the other hand, if motor M runs in generator operation, a negative DC component is added to the inductive intermediate link current $I_{di}$, and the current waveform designated as $I_{dg}$ is produced.

As a result of the current waveform of the intermediate-link current $I_d$, it is therefore found that a simple polarity determination of the intermediate-link current $I_d$ is not sufficient as a criterion for the energy direction present. This results from the fact that in the purely inductive load case, and in the case of a small active motor or generator current, the intermediate-link current $I_d$ changes its sign continuously, as can be seen in FIG. 2. The polarity of intermediate-link current $I_d$ is therefore interrogated only at given point in time $t_\mu$. These points in time $T_\mu$ are located always 30°, or T/12, after each change of the addressing combination of switches S1 to S6. As shown in FIG. 2, the intermediate-link current $I_d$ is zero at this point in time for a purely inductive load. However, this link current is positive if active power is delivered, such as by motor operation, and negative, if active power is consumed, such as by generator operation. Thus, a safe criterion for the direction of the active current is available. Since the addressing combination of the switches S1 to S6 changes with the period T/6, the polarity is interrogated with this period, or six times the frequency of the output voltage of the inverter.

In FIG. 2, the "on" times of the switches S1 to S6, as well as the voltage and current diagrams, are shown for the case of full drive of the inverter. The considerations made here apply, however, also if inverter 2 is not operated with full drive.

Figure 3:
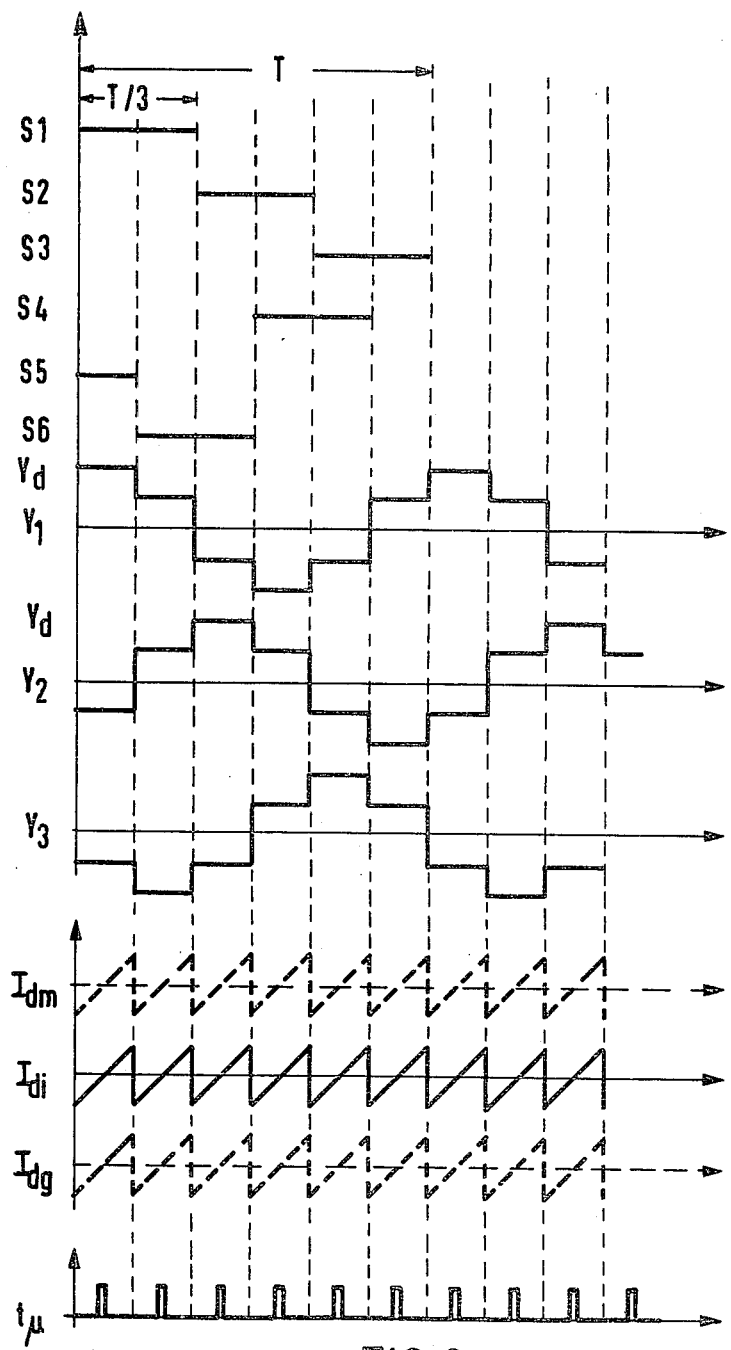

FIG. 3 shows the "on" times of switches S1 to S6, as well as the waveform of the phase voltages $V_1$ to $V_3$, and the intermediate-link current $I_d$. These waveforms are shown for the case wherein the switches S1 to S3 are addressed by 120° blocks, i.e., with a control angle of $\pi/3$. In this case, a staircase voltage waveform is obtained, wherein phase voltages $V_1$ to $V_3$ change between the full intermediate-link voltage $V_d$, one-half the intermediate-link voltage $V_d$, and the corresponding negative values. The derivation of the phase voltages $V_1$ to $V_3$ from the switching states of the switches S1 to S3 is described in the above-mentioned text by Manfred Meyer, at pages 200 to 201. Accordingly, such a derivation will not be explained here in detail.

With this type of drive, the intermediate-link current $I_d$ has a sawtooth waveform for purely inductive load. The sawtooth curve is shifted by a DC component in the positive direction if the motor M takes on active load, and in the negative direction if it delivers active power. In this case, since the intermediate-link current $I_d$ goes through zero, for purely inductive load, 30° after each change of the switch combination of switches S1 to S6, the polarity is interrogated at a point in time $t_\mu$ which is always 30° after each change of the addressing combination, or with reference to the voltage waveform, 30° after each zero crossing of a phase voltage $V_1$ to $V_3$.

The polarity interrogation times $t_\mu$ can be derived in a simple manner from inverter control unit 6. As explained in the above-mentioned text by Ernst and Stroehle, at page 55, the inverter control unit is constructed from a frequency generator followed by a ring counter. It is only necessary to provide additional counters, the outputs of which are programmed for the times $t_\mu$.

Circuitwise, the polarity is determined in the embodiment of FIG. 1 by the provision that a measuring resistor 18 which carries the intermediate-link current $I_d$ is arranged in the intermediate link. Resistor 18 is followed by a differential amplifier 18a having an output which produces a measured value for the intermediate-link current $I_d$. This measured value is conducted to a polarity interrogation stage 5 which is controlled by inverter control unit 6. The polarity signal obtained by a polarity interrogation stage 5 is conducted to a second input of an AND gate 17, which, as already described, receives the voltage increase signal at its first input. If a voltage increase is present, and the feedback of motor M has been ascertained by the polarity interrogation of the intermediate-link current, then the AND condition is realized and double-throw switch 8 is actuated. In this manner, the control pulses from line control set 7 are switched from converter 1a to converter 1b which operates as an inverter such that the latter feeds energy from the intermediate-link capacitor 3 back into the network.

Figure 4:
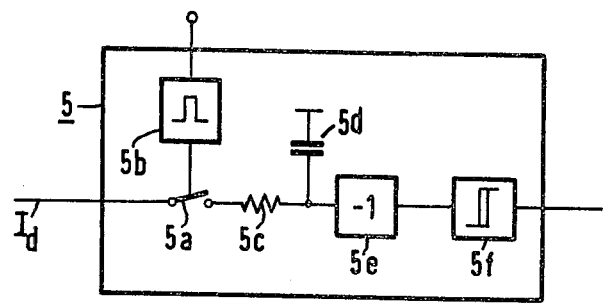
FIG. 4 is a block and schematic representation of an interrogation stage.

FIG. 4 is a block and schematic representation of an embodiment of a polarity interrogation stage. The measured value of intermediate-link current $I_d$ is conducted via a measured value switch 5a to a smoothing stage consisting of a series resistor 5c and a shunt capacitor 5d. Measured value switch 5a is switched-on by a pulse generator 5b which, as described, is triggered by the inverter control unit 6 30° after each change of the addressing combination of switches S1 to S6 of inverter 2. Thus, the value of current $I_d$ is always interrogated at the time $t_\mu$, where a continuous signal is obtained from the individual pulses by the smoothing stage 5c, 5d. This continuous signal is inverted by inverter 5e which is followed by a limit indicator 5f which produces an output signal when the smoothed interrogation signal exceeds a predetermined negative value. Limit indicator 5f provides at its output the desired polarity signal which has the value "1" if the motor M feeds back to the intermediate link. As described, an AND gate 17 is addressed by this polarity signal.

In the specific embodiment of the invention described so far, the determination of the current in the intermediate link is necessary for the interrogation of the polarity. Since one of the output currents $I_{L1}$ to $I_{L3}$ is always identical with the intermediate-link current $I_d$, it also possible to determine the intermediate-link current $I_d$ from the output currents $I_{L1}$ to $I_{L3}$ by a suitable choice of the output currents. These output currents are usually measured anyhow by current transformers in the output line.

Figure 5:
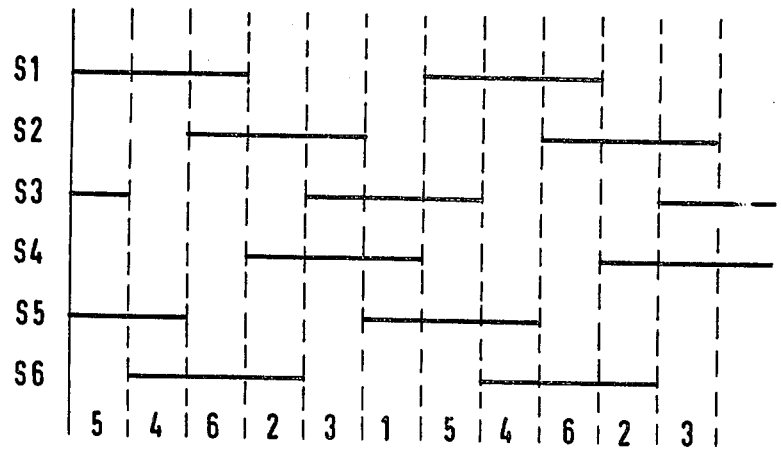
FIG. 5 is a control signal diagram which is useful in explaining the operation of the embodiment of FIG. 1.

FIG. 5 is a control diagram for switches S1 to S6, according to FIG. 1. Since the two switches of switches S1 to S6 which are connected to a bridge arm are always driven inversely to each other, each switch combination of the six switches S1 to S6 can be completely characterized by the switch combinations, for example, illustratively of the switches S1 to S3. Each switch combination can therefore be characterized by a digital signal wherein, for example, the switching state of switch S1 represents the most significant digit, the switching state of switch S2 represents the second highest digit, and the switching state of switch S3 represents the least significant digit. In the control diagram of FIG. 5, the binary numbers corresponding to the respective switching states of switches S1 to S6 are indicated in decimal notation.

Considering the switching diagram of FIG. 5 in conjunction with the bridge circuit of inverter 2 according to FIG. 1, it is realized that the intermediate-link current $I_d$ can be determined from the output currents $I_{L1}$ to $I_{L3}$ in accordance with the following scheme: if switches S1 and S3 are switched on, i.e., for the addressing combination designated with 5, the intermediate-link current is equal to the negative output current $I_{L2}$, since the intermediate-link current $I_d$ is distributed over the switches S1 and S3, flows through motor M and flows back again into the intermediate link via switch S5 as current $-I_{L2}$. If only the switch S1 is switched on, i.e., the addressing combination 4 is present, the intermediate-link current $I_d$ can only flow through the switch S1 and is therefore identical with the output current $I_{L1}$, etc.

The intermediate-link current $I_d$ can therefore be determined from the output currents $I_{L1}$ to $I_{L3}$ or from their inverted values by selecting them via switches which are driven dependent upon the addressing combinations of the switches S1 to S3.

Figure 6:
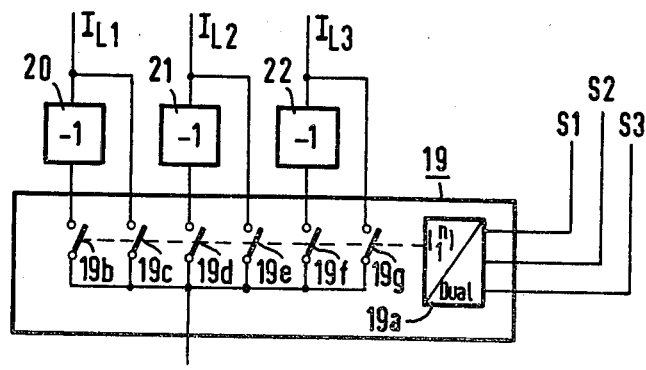
FIG. 6 is a block and schematic representation of an evaluation circuit.

FIG. 6 shows an evaluation circuit constructed in accordance with the principles of the invention for determining the intermediate-link current $I_d$. The output currents $I_{L1}$, $I_{L2}$, and $I_{L3}$ are conducted to the inputs of a multiplexer 19, both directly and via inverting stages 20, 21, and 22. Thus, multiplexer 19 receives the output currents in inverted and noninverted forms. The addressing inputs of multiplexer 19 are connected to the addressing lines of switches S1 to S3.

Multiplexer 19 contains six switches, 19b to 19g, via which the inputs are connected to a common output. Furthermore, a decoder 19a is provided which addresses the switches 19b to 19g with the binary number given by the addressing combination of switches S1 to S3. Decoder 19 has six outputs which are each assigned a respective one of binary numbers 1 to 6, according to FIG. 5. The output assigned to binary number 1 is connected to switch 19g, the output assigned to binary number 2 is connected to switch 19e, the output assigned to binary number 3 is connected to switch 19b, the output assigned to binary number 4 is connected to switch 19c, the output assigned to binary number 5 is connected to switch 19b, and the output assigned to binary number 6 is connected to switch 19f. Thus, switch 19d, for example, is addressed according to the already explained scheme, if switches S1 and S3 are closed, and therefore the inverted output current $I_{L2}$ is used as the intermediate-link current $I_d$. If only switch S1 is closed, switch 19c is closed and the output current $I_{L1}$ is used as the intermediate-link current $I_d$, etc. The measured value for the intermediate-link current $I_d$ which is present at the output of multiplexer 19 is conducted to the polarity interrogator 5, according to FIG. 1. The circuit of FIG. 6, therefore, allows measuring resistor 18 and differential amplifier 18a, according to FIG. 1, to be replaced.

Although the invention has been described in terms of specific embodiments and applications, persons skilled in the art, in light of this teaching, can produce additional embodiments without departing from the spirit or exceeding the scope of the claimed invention. Accordingly, it is to be understood that the drawings and descriptions in this disclosure are proffered to facilitate comprehension of the invention, and should not be construed to limit the scope thereof.

What is claimed is:

1. A method for operating an intermediate-link frequency converter of the type wherein electrical energy flows in either of two directions, the intermediate-link frequency converter further being of the type having two controlled antiparallel-connected converters which conduct in feeding in and feedback directions, respectively, and which are connected via an intermediate link to an inverter in a three-phase bridge circuit, the inverter having a plurality of addressable switches, the method comprising the steps of:
impressing a voltage across the intermediate link;
interrogating the polarity of the intermediate-link current 30° after each change of the addressing combination of the switches of the inverter;
comparing the intermediate-link voltage against a reference value;
switching on the converter of the intermediate-link converter which is arranged in the feedback direction as long as the interrogated polarity of the intermediate-link current is negative and the intermediate-link voltage is larger by a fixed amount than said reference value; and
switching on the converter of the intermediate-link converter which is arranged in the feeding in direction when the converter arranged in the feedback direction is switched-off.

2. A circuit arrangement for operating an intermediate-link frequency converter of the type having an inverter with switches which are addressable in a plurality of combinations to produce output currents at respective outputs, the circuit arrangement comprising:
circuit means having an output for producing a polarity signal;
electronic measurement value switch means for receiving an intermediate-link current measurement value signal;
smoothing stage means for coupling said electronic measurement value switch means to said circuit means; and
control means for controlling the conductive state of said electronic measurement value switch means, said electronic measurement value switch means being controlled to a conductive state 30° after each change of an addressing combination of the inverter.

3. The circuit arrangement of claim 2 wherein there is further provided multiplexer means, said multiplexer means having a first group of input terminals for receiving respective ones of the output currents of the inverter, and a second group of input terminals for receiving respective signals corresponding to inverted output currents of the inverter, said first and second group of inputs each having at least one switch associated therewith, said switches having second terminals thereof connected to a common output, said switches being controlled by said control means.

4. The circuit arrangement of claim 2 or 3 wherein there is further provided comparator stage means for producing at an output thereof a signal corresponding to a voltage increase at the intermediate link, when said voltage increase exceeds a predetermined value.

5. The circuit arrangement of claim 4 wherein there is further provided AND gate means having first and second inputs for receiving said polarity signal and said voltage increase signal, respectively, and an output for producing a signal for selectably actuating the inverters.

6. The circuit arrangement of claim 2 wherein said circuit means comprises inverting operational amplifier means having an input coupled to said smoothing stage means and an output and limit indicator means coupled to said output of said inverting operational amplifier means for producing an output signal when the input of said inverting operational amplifier means exceeds a predetermined value.

* * * * *